United States Patent
Gupta

(10) Patent No.: US 11,334,349 B2
(45) Date of Patent: May 17, 2022

(54) REMOVING FEATURE FLAG-RELATED CODEBASE FROM APPLICATIONS

(71) Applicant: Dell Products L.P., Round Rock, TX (US)

(72) Inventor: Shubham Gupta, Jaipur (IN)

(73) Assignee: Dell Products L.P., Round Rock, TX (US)

( * ) Notice: Subject to any disclaimer, the term of this patent is extended or adjusted under 35 U.S.C. 154(b) by 239 days.

(21) Appl. No.: 16/575,807

(22) Filed: Sep. 19, 2019

(65) Prior Publication Data

US 2021/0089299 A1 Mar. 25, 2021

(51) Int. Cl.
  *G06F 8/72* (2018.01)
  *G06F 11/36* (2006.01)
  *G06F 8/41* (2018.01)

(52) U.S. Cl.
  CPC .............. *G06F 8/72* (2013.01); *G06F 8/433* (2013.01); *G06F 11/3612* (2013.01)

(58) Field of Classification Search
  CPC .................................... G06F 8/72; G06F 8/433
  See application file for complete search history.

(56) References Cited

U.S. PATENT DOCUMENTS

| | | | | |
|---|---|---|---|---|
| 2006/0041875 A1* | 2/2006 | Peri | ........................ | G06F 8/443 717/151 |
| 2011/0083118 A1* | 4/2011 | Moore | ...................... | G06F 8/75 717/110 |
| 2011/0099542 A1* | 4/2011 | Branda | .................. | G06F 11/301 717/154 |
| 2014/0379666 A1* | 12/2014 | Byron | ................... | G06F 40/177 707/687 |
| 2015/0254165 A1* | 9/2015 | Baril | .................... | G06F 11/3664 714/38.1 |
| 2016/0063282 A1* | 3/2016 | Shani | ........................ | G06F 9/38 717/121 |
| 2019/0187973 A1* | 6/2019 | Weigert | ..................... | G06F 8/72 |

(Continued)

OTHER PUBLICATIONS

Qian et al., "RAZOR: A Framework for Post-deployment Software Debloating", in Proceeding of 28th USENIX Security Symposium, Santa Clara, CA, Aug. 14-16, 2019 (Year: 2019).*

(Continued)

*Primary Examiner* — Jae U Jeon
(74) *Attorney, Agent, or Firm* — Daly, Crowley, Mofford & Durkee LLP

(57) ABSTRACT

A system and method automatically refactor mature program code having interdependent features to remove instructions pertaining to features that are no longer used. To facilitate reduction of the number of feature dependencies to test, instrumentation data are analyzed to determine which of the available features are in actual use. A graph of feature dependencies is built based on the program configuration, and the program code is simulated, according to existing testing protocols, with various combinations of features disabled to determine whether the program continues to function without error. When features are found that can be safely removed, the codebase is automatically refactored to eliminate the implementing code corresponding to the features. The refactored code then may be further automatically retested and deployed into the production environment.

20 Claims, 4 Drawing Sheets

(56) References Cited

U.S. PATENT DOCUMENTS

2019/0196939 A1* 6/2019 Lengauer ............ G06F 11/3006
2019/0235993 A1* 8/2019 Modeel ..................... G06F 8/60
2019/0369997 A1* 12/2019 Koyama ................ G06F 11/36
2020/0210158 A1* 7/2020 Bucuvalas .............. G06F 8/433

OTHER PUBLICATIONS

Wikipedia, "Code Refactoring", http://en.wikipedia.org/wiki/Code_refactoring, Internet Archive Aug. 26, 2018 (Year: 2018).*
Qian ("RAZOR: A Framework for Post-deployment Software Debloating"), Aug. 2019 (Year: 2019).*

* cited by examiner

REMOVING FEATURE FLAG-RELATED CODEBASE FROM APPLICATIONS

FIELD

The disclosure pertains generally to arrangements for software engineering, and more particularly to automatic refactoring of program code based on performance monitoring of features.

BACKGROUND

Feature toggles (also known as feature flags) are a design technique in software development by which the execution (or not) of certain features by a software program is controlled by variables that may be read from a configuration file or database. Feature toggles are useful for testing experimental features just added to a mature program, because the features can be switched on or off without changing the design of the program or its program code.

Once testing is complete, software applications may be deployed to a production environment with a particular feature "permanently enabled", while leaving in the code execution paths used prior to the feature being added. Ideally, these old execution paths should be removed when they are no longer needed, but the rush to deploy new versions often takes priority over cleaning up (refactoring) software to eliminate dead code. Portions of the otherwise dead code may be picked up and used by features that are added at a later time, and portions of some live code may be used in multiple features that are eventually obsoleted. As a result, after time has passed from adding any togglable feature, growth of the codebase makes it difficult to know the impact of removing the feature on the qualitative operation of the applications. Moreover, the number of possible dependencies of one feature on another grows mathematically as the factorial of the number of features, so it may be impossible as a practical matter to test the effects on application performance of removing every combination of features.

SUMMARY OF DISCLOSED EMBODIMENTS

Disclosed embodiments of the concepts, structures, and techniques herein allow refactoring of software to eliminate code for features that are no longer needed, by simulating the effects of removing one or more features only from the most commonly executed code paths within a software service. These most commonly executed code paths, in turn, are determined by monitoring the performance of the service while it is actually deployed, using instrumentation of the code. Once these code paths are known, only features appearing therein need to be tested.

In greater detail, the number of combinations of features to test is reduced to a practical level, by instrumenting the code for the service (and/or the individual features) with logging functions, and the logs that are generated are analyzed to determine only the code paths in actual use, or having a minimum threshold of use. Features that are not used by these code paths are candidates to be removed. To verify that these features actually can be removed without negatively impacting overall function of the service, the highly-trafficked code paths are simulated with the appropriate features turned off, and the results are reviewed for errors. If no errors occurred, then the program code is automatically refactored to remove branches that invoke the unnecessary features. The refactored code may be sent to integration testing to ensure that the overall application functionality is not impacted. Finally, the refactored code may be redeployed as a new version of the service, thereby reducing the codebase and thus the likelihood that the service will experience future errors, improving the operation of the service and the computer system on which it executes.

Thus, a first embodiment is a method of refactoring program code of a software service having a plurality of features. The method includes creating a graph of the functional dependencies between the plurality features. The method also includes measuring a frequency or count of usage for each of a plurality of code paths executed by the software service in a production environment. The method further includes, for each code path having a usage exceeding a given threshold, using the graph of functional dependencies to simulate whether errors would occur during execution of the code path if one or more selected features in the plurality of features were disabled. The method finally includes, for each feature whose disabling would not generate errors during execution of any such code path, automatically refactoring the program code of the software service to remove the program code implementing the feature.

In some embodiments, creating the graph comprises recursively scanning program code of the software service for named feature flags to determine the dependencies between the features.

In some embodiments, determining the plurality of code paths executed by the software service, or measuring the corresponding frequency or count of usage, or both, comprises analyzing data logged by the software service during execution in the production environment.

In some embodiments, the given threshold for usage comprises either a percentage or a temporal frequency of overall usage of code paths in the software service in the production environment.

In some embodiments, the one or more selected features is selected either by automatically traversing the graph of the functional dependencies, or by receiving an input from a user, or both.

Some embodiments further include automatically subjecting the refactored program code to one or more unit tests, integration tests, performance tests, or smoke tests to verify that removal of the program code implementing the feature will not result in execution errors.

Some such embodiments additionally include, when the verification is successful, automatically redeploying the refactored code into the production environment as the software service.

A second embodiment is a tangible, computer-readable storage medium, in which is non-transitorily stored computer program code for performing any of the above method embodiments.

A third embodiment is a system for refactoring program code of a software service having a plurality of features and executing in a production environment, the software service logging data to a logging database. The system includes a graph creator for creating a graph of the functional dependencies between the plurality of features. The system also includes a logging interface for measuring a frequency or count of usage for each of a plurality of code paths executed by the software service in a production environment. The system further includes a code path selector for selecting, from the plurality of code paths, those code paths having a usage exceeding a given threshold. The system additionally includes a simulator for simulating, for each of the selected code paths and using the graph of functional dependencies, whether errors would occur during execution of the code path if one or more selected features in the plurality of features were disabled. The system finally includes a refactoring unit for automatically refactoring the program code of the software service to remove the program code implementing each feature whose removal would not generate errors during execution of any of the selected code paths.

In some embodiments, the graph creator is configured for recursively scanning program code of the software service for named feature flags to determine the dependencies between the features.

In some embodiments, the logging interface is further configured for determining the plurality of code paths executed by the software service, or measuring the corresponding frequency or count of usage, or both, by analyzing data logged in a logging database by the software service during execution in the production environment.

In some embodiments, the simulator is configured to obtain the one or more selected features either by automatically traversing the graph of the functional dependencies, or by receiving an input from a user, or both.

In some embodiments that are coupled to an integration tester, the refactoring unit automatically causes the integration tester to subject the refactored program code to one or more unit tests, integration tests, performance tests, or smoke tests to verify that removal of the program code implementing the feature will not result in execution errors.

In some embodiments that are coupled to a deployment gateway, the refactoring unit automatically causes the deployment gateway to redeploy the refactored code into the production environment as the software service.

DESCRIPTION OF THE SEVERAL VIEWS OF THE DRAWINGS

The manner and process of making and using the disclosed embodiments may be appreciated by reference to the drawings, in which.

DETAILED DESCRIPTION

Figure 1:
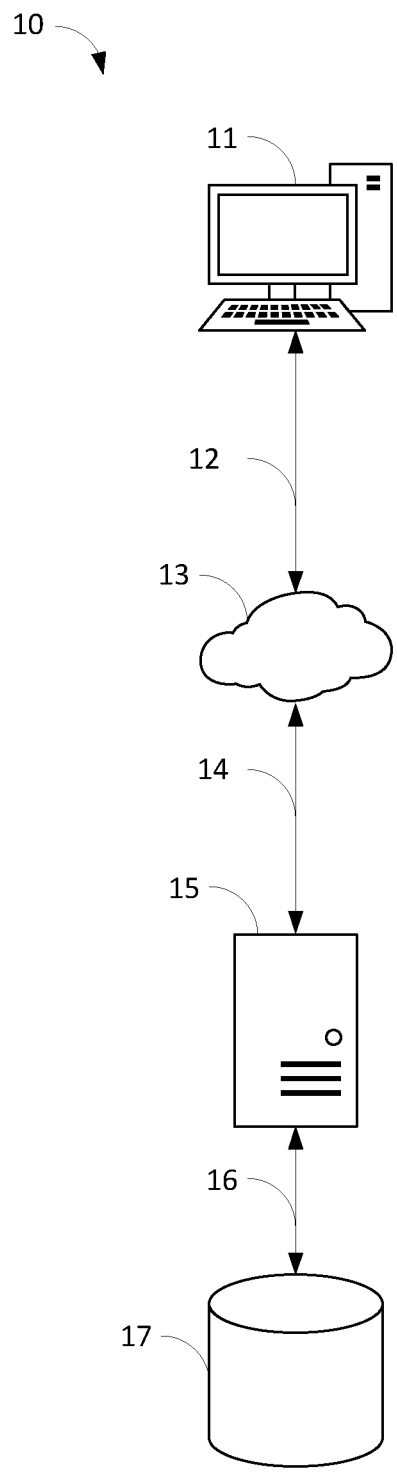
FIG. 1 schematically shows a typical client-server system in which the disclosed concepts, structures, and techniques may be advantageously embodied.

FIG. 1 schematically shows a typical client-server system in which the disclosed concepts, structures, and techniques may be advantageously embodied. In accordance with client-server principles, the system 10 includes at least one client device coupled for bidirectional data communication with at least one server device using a data network. Generally, the client requests, via the data network, that the server perform a computation or other function, and the server responsively fulfills the request, optionally returning a result or status indicator to the client via the data network.

Thus, the system 10 includes a client device 11. The client device 11 is illustrated as a desktop computer, but may be any electronic device known in the art, including without limitation a laptop computer, tablet computer, smartphone, embedded system, or any other device capable of transmitting and receiving data, and requesting that another electronic device perform a computation.

The client device 11 is coupled, via a data link 12, to a data network 13. The data link 12 is any combination of hardware or software suited for communicating data between the client device 11 and other electronic devices via the data network 13. The data link 12 may be, for example, a wired Ethernet link based on the Institute of Electrical and Electronics Engineers ("IEEE") 802.3 family of standards, a wireless radio link based on the IEEE 802.11 family of standards ("Wi-Fi"), or any other data connection.

The data network 13 is any combination of hardware or software suited for communicating data between electronic devices via data links. The data network 13 may be, for example, a local area network ("LAN"), a wide area network ("WAN"), a metropolitan area network ("MAN"), a virtual private network ("VPN"), the Internet, or any other type of data network.

It is appreciated that a data network 13 operates to mediate data communication between multiple electronic devices. Thus, the depiction of only a single client device 11 in FIG. 1 is merely illustrative, and a typical system 10 may have any number of client devices coupled for data communication using corresponding data links to the data network 13. It is also appreciated that the data network 13 may be operated by any number of autonomous entities, and thus may be a conglomeration of smaller networks that exchange data according to standardized protocols and data formats, including without limitation the Internet Protocol ("IP") specified by Internet Standard STD 5, the User Datagram Protocol ("UDP") specified by Internet Standard STD 6, and the Transmission Control Protocol ("TCP") specified by Internet Standard STD 7, among others.

The data network 13 allows the client device 11 to communicate with a server device 15, which is coupled to the data network 13 using a data link 14. The data link 14 is any combination of hardware or software suited for communicating data between the server device 15 and other electronic devices via the data network 13. The server device 15 may be any electronic device known in the art that is capable of transmitting and receiving data, and performing a computation on behalf of another electronic device.

Again, the data network 13 operates to mediate data communication between multiple electronic devices. Thus, the depiction of only a single server device 15 in FIG. 1 is merely illustrative, and a typical system 10 may have any number of server devices coupled for data communication using corresponding data links to the data network 13. In particular, to provide simultaneous service to large numbers of client devices, a particular computation (or type of computation, such as rendering a web page) may be allocated to one of multiple server devices using a load balancer or other device.

It is further appreciated that the server device 15, along with additional server devices if required, may provide well-defined operations known as "services" according to a service-oriented architecture ("SOA"), as those terms are known in the art. One illustrative service is a web service that receives requests from a client device 11 for web pages using a uniform resource locator ("URL"), and responsively creates and returns a web page to the client device 11. As is known in the art such a web service may use other services in the SOA to form the web page. For example, the web service might use authentication data sent from the client device 11 to access private data using a subordinate security service.

It is appreciated in accordance with client-server principles that the designation of device 11 as the "client device" and device 15 as the "server device" is arbitrary, as most electronic devices that are capable of transmitting and receiving data can perform computations on behalf of other electronic devices upon receipt of data, so requesting, according to a mutually agreed protocol. Thus, the designation of "client device" and "server device" is made herein with regard to an intended mode of operation of the system 10, namely that the client device 11 is the device requesting that a particular computation be performed on behalf of a user thereof, and that the server device 15 operates a "service" to perform the computation and communicate the results to the client device 11. A typical protocol for such interaction is the Hypertext Transfer Protocol ("HTTP" or "HTTP/1.1") specified as a proposed Internet Standard by Requests for Comment ("RFC") 7230 through 7235, which is used to implement the World Wide Web.

FIG. 1 shows the server device 15 coupled, via a storage link 16, to a data storage device 17. The data storage device 17 may be a database, file system, volatile or non-volatile memory, network attached storage ("NAS"), storage area network ("SAN"), or any other hardware or software that is capable of storing data used by a server device 15 or a service executing thereon. The storage link 16 may be any hardware or software capable of communicating data between the server device 15 and the data storage device 17. It is appreciated that, where more than one server device 15 is present, multiple server devices may communicate with the same data storage device 17 to provide data sharing between the server devices.

It is appreciated that a requested computation may be done in several parts, thereby requiring the system 10 to retain an intermediate computational state between requests. If the services provided by the server device 15 do not store any such state (for example, to simplify their design), then the client device 11 must supply all state with each request. This type of communication may be provided using the representational state transfer ("REST") client-server architecture as known in the art. In addition to being a stateless client-server architecture, REST systems permit responses to requests with identical inputs to be cached to improve response time; permit layering of services, thereby multiplying available functionality; permit services to require client devices to perform some computation locally to improve performance; and provide a uniform interface for all client devices.

Figure 2:
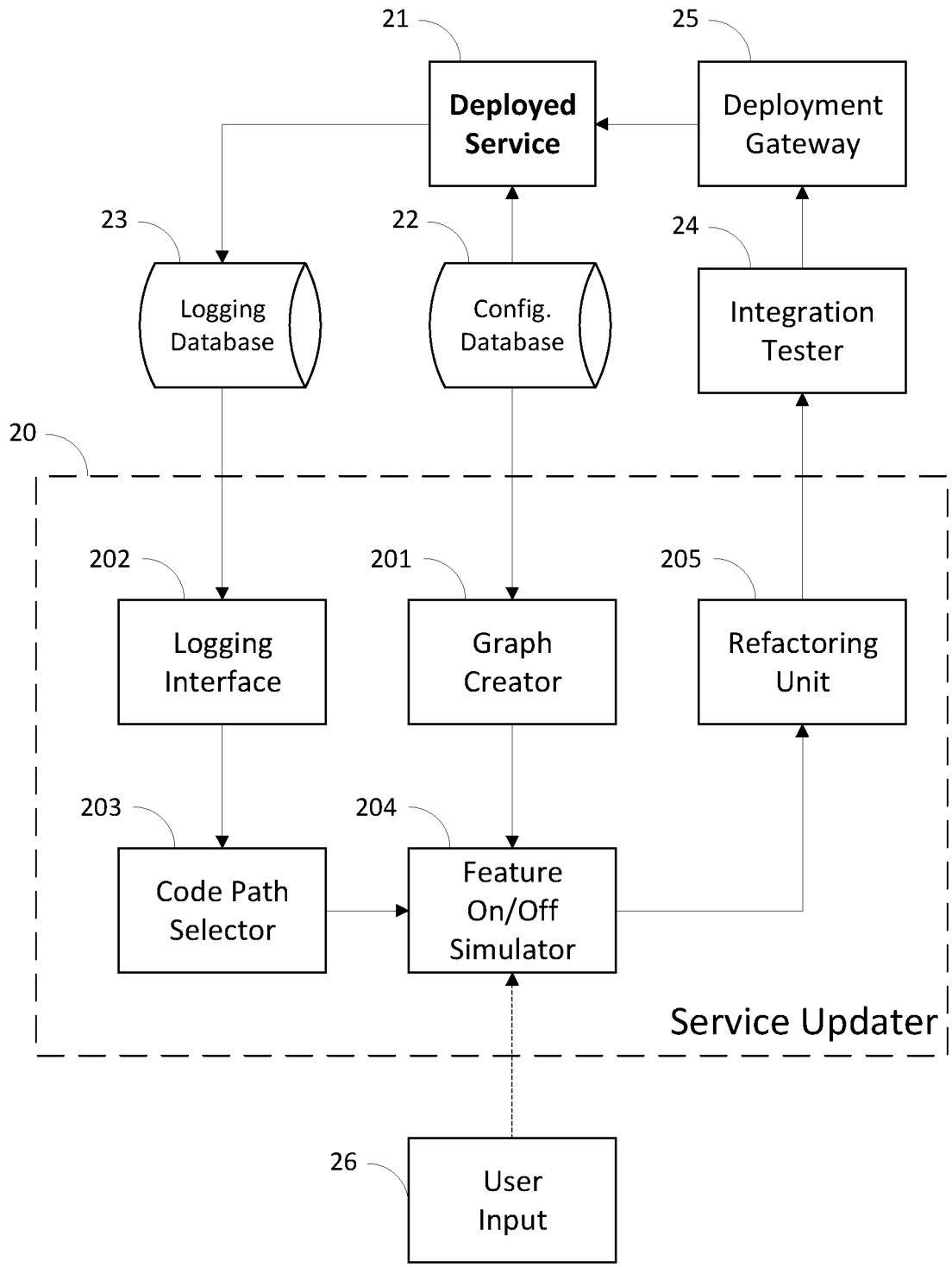
FIG. 2 schematically shows relevant components of a system according to an embodiment of the concepts, structures, and techniques disclosed herein.

FIG. 2 schematically shows relevant components of a service updater 20 according to an embodiment of the concepts, structures, and techniques disclosed herein. The service updater 20 performs the advantageous functions disclosed herein with respect to a deployed service 21. That is, the service updater 20 automatically refactors the program code of the deployed service 21 to improve its efficiency and the operation of the computer system in which the deployed service 21 is executing.

The deployed service 21 and its relevant environment are first described, so that the operation of the service updater 20 may be more fully appreciated. The deployed service 21 may perform any computation as described above, and may be, for example, a web service for providing web pages to client devices in a client-server environment. Such client devices may include, for example, the client device 11 of FIG. 1, and the deployed service 21 may execute on the server device 15. However, it is appreciated that the deployed service 21 is not limited to just web services, and may be used for desktop application services, mobile device (e.g. smartphone) app services, web-based application programming interfaces ("APIs"), modern microservices, and other middleware, among other types of services.

The deployed service 21 executes program code that has one or more features whose individualized execution is configured using feature toggles or flags that may be stored in a configuration database 22. The configuration database 22 may be implemented, for example, by the data storage device 17 or another device known in the art for implementing databases. Flags are loaded by the deployed service 21 from the configuration database 22 when the service first begins executing, and from time to time when triggered by appropriate events. The details of how a deployed service 21 may load flags from a database at various times are known in the art.

The feature flags stored in the configuration database 22 may be updated independently of the operation of the deployed service 21, and the service may be notified to reload them after such an update. By doing so, the operation of the deployed service 21 advantageously may be altered without changing its program code.

In accordance with embodiments, the program code of the deployed service 21 is instrumented. As is known in the art, instrumentation of program code allows programs other than the deployed service 21 to monitor (and sometimes directly alter) its performance, including to identify errors. Typically/1+ his is accomplished by the deployed service 21 sending code tracing data, debugging data, profiling data, performance counters, and other such data to either another program directly, or storing these data in a database, such as logging database 23. The logging database 23 may be implemented, for example, by the data storage device 17 or another device known in the art for implementing databases. While the configuration database 22 and the logging database 23 are indicated in FIG. 2 as separate databases, it is appreciated that a person having ordinary skill in the art would know how to combine them as a single database in various embodiments.

To provide for an optimal experience for users of clients requesting services from the deployed service 21, the service may be deployed in a so-called "production environment" that is functionally separate from a so-called "development environment" in which new features are developed and tested. To provide testing for services before they are deployed, the development environment may include an integration tester 24. As is known in the art, an integration tester 24 may be implemented by a computer system similar to the computer system on which the deployed service 21 executes, and may perform a variety of tests on the program code. Some of these tests include, for example: smoke tests or build verification tests to ensure that features compile correctly and major features operate as expected; unit tests to ensure that individual features operate correctly across a variety of inputs, integration tests to ensure that different features operate correctly when used together, and performance tests to ensure that the overall system meets performance goals, among others known in the art. It is appreciated that the various tests just listed may be performed in embodiments using different hardware or software. It should be understood that all of these tests are combined into the integration tester 24 merely for simplicity of description, and that embodiments are not necessarily limited to use of a single hardware or software component for performing all of these tests.

Only after the new service has been tested should it be deployed from the development environment to the testing environment. As deployment often requires complex configuration and adaptation of the software to the production environment that is prone to errors, illustrative systems include a deployment gateway 25. The deployment gateway 25 obtains vetted service program code from the integration tester 24, or from a storage location used by the integration tester 24, such as a source code repository as known in the art (not shown). The deployment gateway 25 then configures the program code for the particular hardware and other services running in the production environment, and deploys it as a new version of the deployed service 21. Thus, for example, the deployment gateway 25 may notify the existing deployed service 21 that it should wind down operation, and when the deployed service 21 has finished executing, the deployment gateway 25 installs the new program code in the production environment and causes it to begin executing.

Having now described the deployed service 21 and its environment, the functional components of the service updater 20 are now explained. Broadly, the service updater 20 determines what program code of the deployed service 21 is executed in the production environment, including what features are used. The service updater 20 analyzes this information to determine which features are stale and may be deactivated without negatively impacting performance of the functions of the deployed service 21. The service updater 20 then automatically refactors the code; that is, it uses code analysis to determine portions of the program code (i.e. individual statements or lines of code) that can be removed without altering the function of the remainder of the code actually used, and then removes them. The service updater 20 and its components described below may be implemented in hardware, firmware, software, any combination thereof, or any other means known in the art that can perform the functions and methods described below.

Thus, the service updater 20 includes a graph creator 201. The graph creator 201 is configured for creating a graph of the functional dependencies between the plurality of features. Such a graph, like all graphs, has nodes (or vertices) and edges connecting them. A dependency graph in accordance with embodiments associates to each node a particular feature of the deployed service 21. The dependency graph also associates to each edge an arrow pointing from the node for a first feature to the node for a second feature, the direction of the arrow indicating that the first feature must be enabled for the second feature to function correctly; that is, the second feature depends on the first feature.

In various embodiments, the graph creator 201 is functionally coupled to receive feature flag names from the configuration database 22 for the deployed service 21, or it may receive these data from another location. In either case, the graph creator 201 recursively scans the program code of the deployed service 21 for occurrences of these flag names and for branching instructions (e.g. if-then constructs), thereby determining which features depend on which other features for their execution. The graph creator 201 meanwhile populates the dependency graph using these data according to techniques known in the art.

The service updater 20 also includes a logging interface 202. The logging interface 202 is configured for measuring a frequency or count of usage for each of a plurality of code paths executed by the deployed service 21. In accordance with the illustrative embodiment shown in FIG. 2, the logging interface 202 is functionally coupled to receive logging or instrumentation data for the deployed service 21 from the logging database 23. The logging database 23 may include data that pertain to services other than the deployed service 21, or other extraneous data, thus the logging interface 202 may include a filter to exclude these other data. The logging interface 202 may determine points in the program code of the deployed service 21 that generated received log entries, thereby associating the log entries with particular code paths or branches. Note that the logging interface 202 determines which code paths the deployed service 21 is executing in actual production use because it operates only on instrumented logging data.

The service updater 20 further includes a code path selector 203. The code path selector 203 is configured to determine which code paths indicated by the logging interface 202 have a usage exceeding a given threshold. The given threshold may be, for example, any use at all, or once per day, or once in the past two weeks, or 100 times executed since the most recent deployment, or some percentage of the total number of code paths or branches actually executed, or any other threshold that is considered by the service owner or developer to be relevant. The given threshold also may be, for example, changed by the service owner or developer as changing conditions demand. It is thus appreciated that any particular usage threshold should not be viewed as limiting the concepts, structures, or techniques disclosed herein.

The service updater 20 has a feature on/off simulator 204 that uses the graph of functional dependencies created by the graph creator 201 to simulate whether errors would occur during execution of the code paths selected by the code path selector 203 if one or more selected features were disabled. The features whose deactivation are to be simulated may be determined automatically, for example by traversing the portion of the dependency graph that includes just the features used by the selected code paths. Alternately or in addition, the feature or features may be chosen by input 26 from a user, such as the service developer, and the dependency graph optionally traversed based on that choice.

Simulation by the feature on/off simulator 204 may include any or all of the tests performed by the integration tester 24 as described above, but especially smoke tests and unit tests on the selected code paths with the selected features disabled. Such testing may be performed, for example, by loading and testing the service in the development environment with the appropriate feature toggles having values that represent a disabled feature, unlike the production environment (i.e. the configuration database 22) in which they have values that represent an enabled feature.

The service updater 20 also has a refactoring unit 205. If the feature on/off simulator 204 determines that one or more of the features can be disabled without generating any errors during the execution of any of the code paths, it directs the refactoring unit 205 to automatically refactor the software service to remove the program code implementing the features and/or code paths. Automatic refactoring of code is known in the art, and may be performed with existing tools for that purpose.

The service updater 20 may be viewed as a new development tool that works with existing tools in the deployment chain. The service updater 20 therefore is shown in FIG. 2 as being coupled to an integration tester 24 already existing in the development environment, and which may be used by developers of the deployed service 21 to perform pre-deployment integration testing. To complete the process of deploying the refactored program code, the service updater 20, and more particularly the refactoring unit 205, sends refactored program code for the service to the integration tester 24 to verify, prior to deployment and in accordance with best practices, that the refactoring itself did not introduce any errors into the program code. If the verification is successful, and the process is acceptable to the service owner, the service updater 20 may trigger the deployment gateway 25 to automatically redeploy the refactored code into the production environment as the software service.

Figure 3:
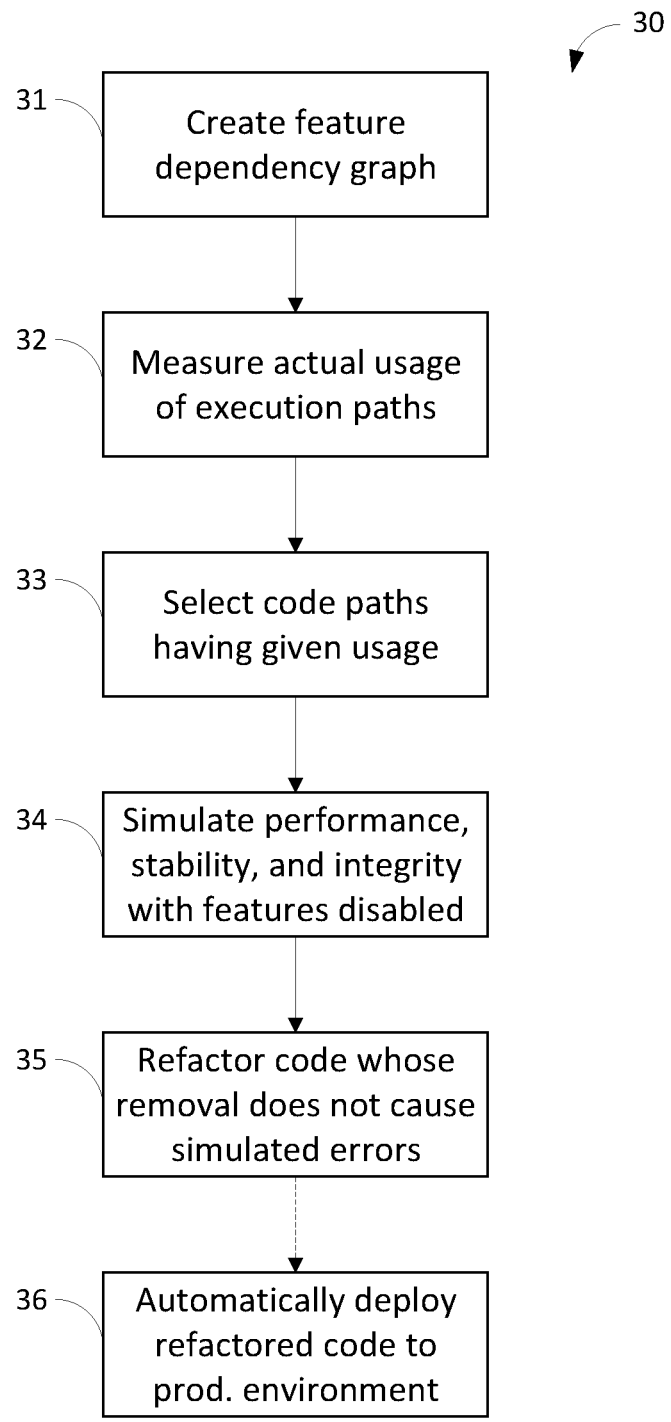
FIG. 3 is a flow diagram for a method according to an embodiment.

FIG. 3 is a flow diagram for a method 30 according to an embodiment of the concepts, structures, and techniques disclosed herein. The method 30 refactors program code of a software service having multiple features, such as deployed service 21, and may be performed by the service updater 20 or other embodiment.

The method 30 begins with a process 31 that creates a feature dependency graph. The process 31 may be performed, for example, by the graph creator 201 described above. In particular, creating the graph may include recursively scanning program code of the software service for named feature flags to determine the dependencies between the features.

The method 30 continues with a process 32 that measures an actual usage of execution paths in the service. The process 32 may be performed, for example, by the logging interface 202 described above. In particular, the process 32 may measure a frequency or usage count for multiple code paths executed by the software service in a production environment. Moreover, the process 32 may determine the code paths actually executed by the software service, or measure the corresponding frequency or count of usage, or both, by analyzing data logged by the software service during execution in the production environment.

The method 30 next provides a process 33 that selects code paths in the service having a given, minimal usage. The process 33 may be performed, for example, by the code path selector 203 described above. In particular, the process 33 may select only those code paths having a usage, determined by process 32, that exceeds a given threshold. As noted above, the given threshold for usage may be, for example, a percentage or a temporal frequency of overall usage of code paths in the software service in the production environment.

The method 30 then requires a process 34 that simulates performance, stability, and integrity of the service with one or more features disabled. The process 34 may be performed, for example, by the feature on/off simulator 204 described above. In particular, the process 34 may use the graph of functional dependencies created in process 31 to simulate one or more of (a) whether the service would continue to operate within acceptable design parameters, such as speed of execution; (b) whether errors would occur during execution of each of the code paths selected in process 33; and (c) whether errors would be introduced into the execution of other features. As noted above, the one or more features may be selected either by automatically traversing the graph of the functional dependencies, or by receiving an input from a user, or both.

The method 30 continues with a process 35 that automatically refactors the program code of the software service to remove program code implementing features that did not cause simulated errors in process 34. The process 35 may be performed, for example, by the refactoring unit 205 described above. In particular, the process 34 may use the graph of functional dependencies created in process 31 to simulate whether errors would occur during execution of each of the code paths selected in process 33.

At this point, the method 30 may terminate. However, in some embodiments, the method 30 continues with a process 36 that automatically deploys the refactored code to a production environment. The process 36 may be performed, for example, by the service updater 20 causing another system, such as the integration tester 24, to automatically subject the refactored program code to one or more unit tests, integration tests, performance tests, or smoke tests to verify that removal of the program code implementing the feature will not result in execution errors. The process 36 also may be performed, for example, by the service updater 20 causing another system, such as the deployment gateway 25, to automatically redeploy the refactored code into the production environment as the software service when the verification is successful.

Figure 4:
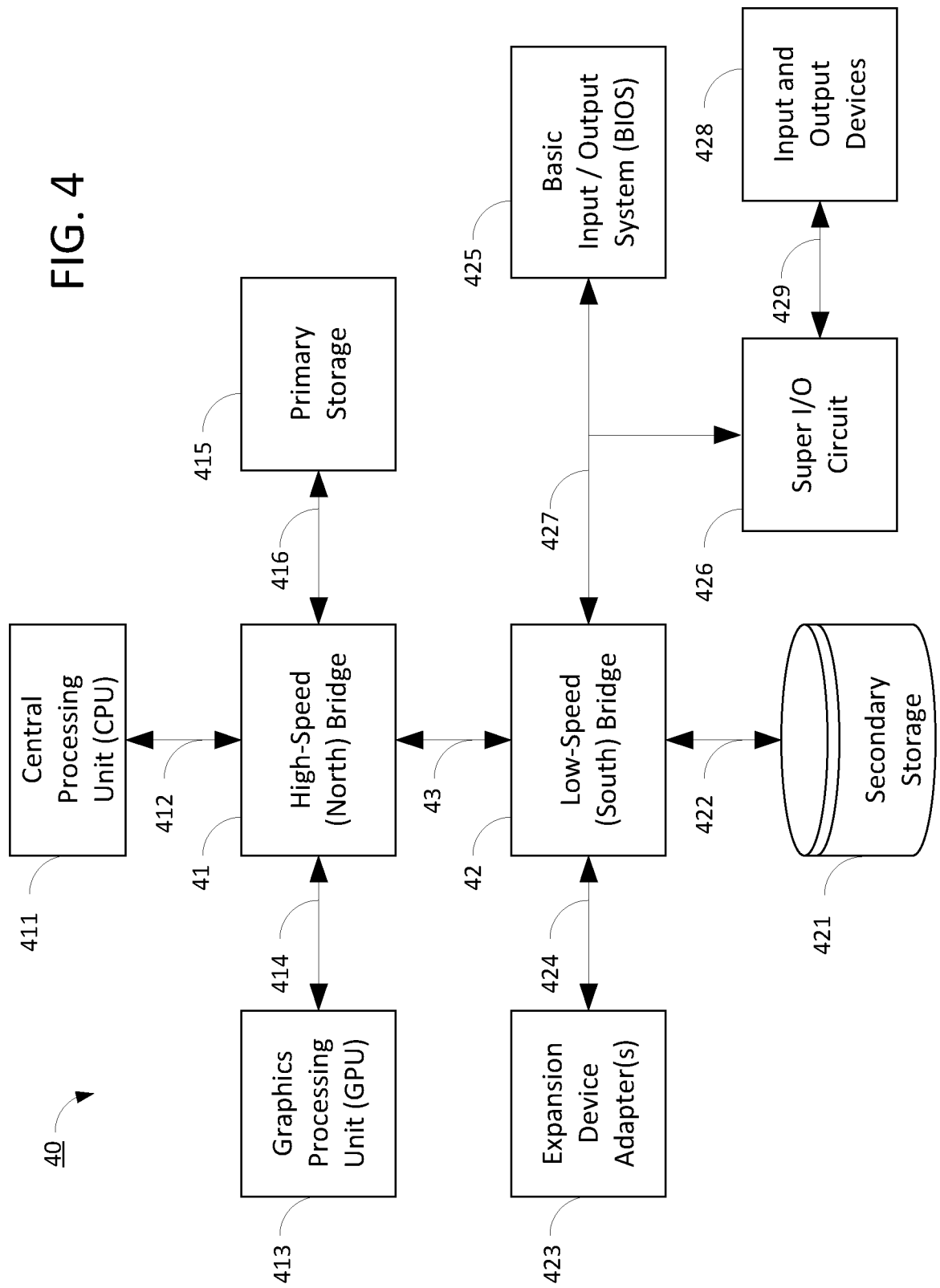
FIG. 4 schematically shows relevant physical components of a computer processing system in accordance with an embodiment.

FIG. 4 schematically shows relevant physical components of a computer system 40 embodiment of the concepts, structures, and techniques disclosed herein. A computer such as computer 40 may be used, for example, to implement all or portions of the client device 11, the server device 15, the data storage device 17, the service updater 20, the deployed service 21, the configuration database 22, the logging database 23, the integration tester 24, the deployment gateway 25, the user input 26, or the method 30. Generally, the computer 40 has many functional components that communicate data with each other using data buses. The functional components of FIG. 4 are physically arranged based on the speed at which each must operate, and the technology used to communicate data using buses at the necessary speeds to permit such operation.

Thus, the computer 40 is arranged as high-speed components and buses 411 to 416 and low-speed components and buses 421 to 429. The high-speed components and buses 411 to 416 are coupled for data communication using a high-speed bridge 41, also called a "northbridge," while the low-speed components and buses 421 to 429 are coupled using a low-speed bridge 42, also called a "southbridge."

The computer 40 includes a central processing unit ("CPU") 411 coupled to the high-speed bridge 41 via a bus 412. The CPU 411 is electronic circuitry that carries out the instructions of a computer program. As is known in the art, the CPU 411 may be implemented as a microprocessor; that is, as an integrated circuit ("IC"; also called a "chip" or "microchip"). In some embodiments, the CPU 411 may be implemented as a microcontroller for embedded applications, or according to other embodiments known in the art.

The bus 412 may be implemented using any technology known in the art for interconnection of CPUs (or more particularly, of microprocessors). For example, the bus 412 may be implemented using the HyperTransport architecture developed initially by AMD, the Intel QuickPath Interconnect ("QPI"), or a similar technology. In some embodiments, the functions of the high-speed bridge 41 may be implemented in whole or in part by the CPU 411, obviating the need for the bus.

The computer 40 includes one or more graphics processing units (GPUs) 413 coupled to the high-speed bridge 41 via a graphics bus 414. Each GPU 413 is designed to process commands from the CPU 411 into image data for display on a display screen (not shown). In some embodiments, the CPU 411 performs graphics processing directly, obviating the need for a separate GPU 413 and graphics bus 414. In other embodiments, a GPU 413 is physically embodied as an integrated circuit separate from the CPU 411 and may be physically detachable from the computer 40 if embodied on an expansion card, such as a video card. The GPU 413 may store image data (or other data, if the GPU 413 is used as an auxiliary computing processor) in a graphics buffer.

The graphics bus 414 may be implemented using any technology known in the art for data communication between a CPU and a GPU. For example, the graphics bus 414 may be implemented using the Peripheral Component Interconnect Express ("PCI Express" or "PCIe") standard, or a similar technology.

The computer 40 includes a primary storage 415 coupled to the high-speed bridge 41 via a memory bus 416. The primary storage 415, which may be called "main memory" or simply "memory" herein, includes computer program instructions, data, or both, for use by the CPU 411. The primary storage 415 may include random-access memory ("RAM"). RAM is "volatile" if its data are lost when power is removed, and "non-volatile" if its data are retained without applied power. Typically, volatile RAM is used when the computer 40 is "awake" and executing a program, and when the computer 40 is temporarily "asleep", while non-volatile RAM ("NVRAM") is used when the computer 40 is "hibernating"; however, embodiments may vary. Volatile RAM may be, for example, dynamic ("DRAM"), synchronous ("SDRAM"), and double-data rate ("DDR SDRAM"). Non-volatile RAM may be, for example, solid-state flash memory. RAM may be physically provided as one or more dual in-line memory modules ("DIMNIs"), or other, similar technology known in the art.

The memory bus 416 may be implemented using any technology known in the art for data communication between a CPU and a primary storage. The memory bus 416 may comprise an address bus for electrically indicating a storage address, and a data bus for transmitting program instructions and data to, and receiving them from, the primary storage 415. For example, if data are stored and retrieved 44 bits (eight bytes) at a time, then the data bus has a width of 44 bits. Continuing this example, if the address bus has a width of 32 bits, then 232 memory addresses are accessible, so the computer 40 may use up to $8*2^{32}=32$ gigabytes (GB) of primary storage 415. In this example, the memory bus 416 will have a total width of 64=96 bits. The computer 40 also may include a memory controller circuit (not shown) that converts electrical signals received from the memory bus 416 to electrical signals expected by physical pins in the primary storage 415, and vice versa.

Computer memory may be hierarchically organized based on a tradeoff between memory response time and memory size, so depictions and references herein to types of memory as being in certain physical locations are for illustration only. Thus, some embodiments (e.g. embedded systems) provide the CPU 411, the graphics processing units 413, the primary storage 415, and the high-speed bridge 41, or any combination thereof, as a single integrated circuit. In such embodiments, buses 412, 414, 416 may form part of the same integrated circuit and need not be physically separate. Other designs for the computer 40 may embody the functions of the CPU 411, graphics processing units 413, and the primary storage 415 in different configurations, obviating the need for one or more of the buses 412, 414, 416.

The depiction of the high-speed bridge 41 coupled to the CPU 411, GPU 413, and primary storage 415 is merely exemplary, as other components may be coupled for communication with the high-speed bridge 41. For example, a network interface controller ("NIC" or "network adapter") may be coupled to the high-speed bridge 41, for transmitting and receiving data using a data channel. The NIC may store data to be transmitted to, and received from, the data channel in a network data buffer.

The high-speed bridge 41 is coupled for data communication with the low-speed bridge 42 using an internal data bus 43. Control circuitry (not shown) may be required for transmitting and receiving data at different speeds. The internal data bus 43 may be implemented using the Intel Direct Media Interface ("DMI") or a similar technology.

The computer 40 includes a secondary storage 421 coupled to the low-speed bridge 42 via a storage bus 422. The secondary storage 421, which may be called "auxiliary memory", "auxiliary storage", or "external memory" herein, stores program instructions and data for access at relatively low speeds and over relatively long durations. Since such durations may include removal of power from the computer 40, the secondary storage 421 may include non-volatile memory (which may or may not be randomly accessible).

Non-volatile memory may comprise solid-state memory having no moving parts, for example a flash drive or solid-state drive. Alternately, non-volatile memory may comprise a moving disc or tape for storing data and an apparatus for reading (and possibly writing) the data. Data may be stored (and possibly rewritten) optically, for example on a compact disc ("CD"), digital video disc ("DVD"), or Blu-ray disc ("BD"), or magnetically, for example on a disc in a hard disk drive ("HDD") or a floppy disk, or on a digital audio tape ("DAT"). Non-volatile memory may be, for example, read-only ("ROM"), write-once read-many ("WORM"), programmable ("PROM"), erasable ("EPROM"), or electrically erasable ("EEPROM").

The storage bus 422 may be implemented using any technology known in the art for data communication between a CPU and a secondary storage and may include a host adaptor (not shown) for adapting electrical signals from the low-speed bridge 42 to a format expected by physical pins on the secondary storage 421, and vice versa. For example, the storage bus 422 may use a Universal Serial Bus ("USB") standard; a Serial AT Attachment ("SATA") standard; a Parallel AT Attachment ("PATA") standard such as Integrated Drive Electronics ("IDE"), Enhanced IDE ("EIDE"), ATA Packet Interface ("ATAPI"), or Ultra ATA; a Small Computer System Interface ("SCSI") standard; or a similar technology.

The computer 40 also includes one or more expansion device adapters 423 coupled to the low-speed bridge 42 via a respective one or more expansion buses 424. Each expansion device adapter 423 permits the computer 40 to communicate with expansion devices (not shown) that provide additional functionality. Such additional functionality may be provided on a separate, removable expansion card, for example an additional graphics card, network card, host adaptor, or specialized processing card.

Each expansion bus 424 may be implemented using any technology known in the art for data communication between a CPU and an expansion device adapter. For example, the expansion bus 424 may transmit and receive electrical signals using a Peripheral Component Interconnect ("PCI") standard, a data networking standard such as an Ethernet standard, or a similar technology.

The computer 40 includes a basic input/output system ("BIOS") 425 and a Super I/O circuit 426 coupled to the low-speed bridge 42 via a bus 427. The BIOS 425 is a non-volatile memory used to initialize the hardware of the computer 40 during the power-on process. The Super I/O circuit 426 is an integrated circuit that combines input and output ("I/O") interfaces for low-speed input and output devices 428, such as a serial mouse and a keyboard. In some embodiments, BIOS functionality is incorporated in the Super I/O circuit 426 directly, obviating the need for a separate BIOS 425.

The bus 427 may be implemented using any technology known in the art for data communication between a CPU, a BIOS (if present), and a Super I/O circuit. For example, the bus 427 may be implemented using a Low Pin Count ("LPC") bus, an Industry Standard Architecture ("ISA") bus, or similar technology. The Super I/O circuit 426 is coupled to the I/O devices 428 via one or more buses 429. The buses 429 may be serial buses, parallel buses, other buses known in the art, or a combination of these, depending on the type of I/O devices 428 coupled to the computer 40.

The techniques and structures described herein may be implemented in any of a variety of different forms. For example, features may be embodied within various forms of communication devices, both wired and wireless; television sets; set top boxes; audio/video devices; laptop, palmtop, desktop, and tablet computers with or without wireless capability; personal digital assistants (PDAs); telephones; pagers; satellite communicators; cameras having communication capability; network interface cards (NICs) and other network interface structures; base stations; access points; integrated circuits; as instructions and/or data structures stored on machine readable media; and/or in other formats. Examples of different types of machine readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data.

In the foregoing detailed description, various features are grouped together in one or more individual embodiments for the purpose of streamlining the disclosure. This method of disclosure is not to be interpreted as reflecting an intention that the claims require more features than are expressly recited. Rather, inventive aspects may lie in less than all features of each disclosed embodiment.

Having described implementations which serve to illustrate various concepts, structures, and techniques which are the subject of this disclosure, it will now become apparent to those of ordinary skill in the art that other implementations incorporating these concepts, structures, and techniques may be used. Accordingly, it is submitted that that scope of the patent should not be limited to the described implementations but rather should be limited only by the spirit and scope of the following claims.

What is claimed is:

1. A method of refactoring program source code of a software service having a plurality of features, the method comprising:
    creating a graph of functional dependencies between the plurality of features;
    measuring a frequency or count of usage for each of a plurality of code paths executed by the software service in a production environment;
    for each code path having a usage exceeding a given threshold, using the graph of functional dependencies to simulate whether errors would occur during execution of the code path if one or more selected features in the plurality of features were disabled; and
    for each feature whose disabling would not generate errors during execution of any such code path, automatically refactoring the program source code of the software service to remove the program source code implementing the feature.

2. The method according to claim 1, wherein creating the graph comprises recursively scanning program source code of the software service for named feature flags to determine the dependencies between the features.

3. The method according to claim 1, wherein measuring the frequency or count of usage, or both, for each of the plurality of code paths comprises analyzing data logged by the software service during execution in the production environment.

4. The method according to claim 1, wherein the given threshold for usage comprises either a percentage or a temporal frequency of overall usage of code paths in the software service in the production environment.

5. The method according to claim 1, wherein the one or more selected features is selected either by automatically traversing the graph of the functional dependencies, or by receiving an input from a user, or both.

6. The method according to claim 1, further comprising automatically subjecting the refactored program source code to one or more unit tests, integration tests, performance tests, or smoke tests to verify that removal of the program source code implementing the feature will not result in execution errors.

7. The method according to claim 6, further comprising, when the verification is successful, automatically redeploying the refactored source code into the production environment as the software service.

8. A tangible, computer-readable storage medium, in which is non-transitorily stored computer program code for performing a method of refactoring program source code of a software service having a plurality of features, the method comprising:
    creating a graph of functional dependencies between the plurality of features;
    measuring a frequency or count of usage for each of a plurality of code paths executed by the software service in a production environment;
    for each code path having a usage exceeding a given threshold, using the graph of functional dependencies to simulate whether errors would occur during execution of the code path if one or more selected features in the plurality of features were disabled; and
    for each feature whose disabling would not generate errors during execution of any such code path, automatically refactoring the program source code of the software service to remove the program source code implementing the feature.

9. The storage medium according to claim 8, wherein creating the graph comprises recursively scanning program source code of the software service for named feature flags to determine the dependencies between the features.

10. The storage medium according to claim 8, wherein measuring the frequency or count of usage, or both, for each of the plurality of code paths comprises analyzing data logged by the software service during execution in the production environment.

11. The storage medium according to claim 8, wherein the given threshold for usage comprises either a percentage or a temporal frequency of overall usage of code paths in the software service in the production environment.

12. The storage medium according to claim 8, wherein the one or more selected features is selected either by automatically traversing the graph of the functional dependencies, or by receiving an input from a user, or both.

13. The storage medium according to claim 8, further comprising automatically subjecting the refactored program source code to one or more unit tests, integration tests, performance tests, or smoke tests to verify that removal of the program source code implementing the feature will not result in execution errors.

14. The storage medium according to claim 13, further comprising, when the verification is successful, automatically redeploying the refactored source code into the production environment as the software service.

15. A system for refactoring program source code of a software service having a plurality of features and executing in a production environment, the software service logging data to a logging database, the system comprising:
 a graph creator for creating a graph of functional dependencies between the plurality of features;
 a logging interface for measuring a frequency or count of usage for each of a plurality of code paths executed by the software service in a production environment;
 a code path selector for selecting, from the plurality of code paths, those code paths having a usage exceeding a given threshold;
 a simulator for simulating, for each of the selected code paths and using the graph of functional dependencies, whether errors would occur during execution of the code path if one or more selected features in the plurality of features were disabled; and
 a refactoring unit for automatically refactoring the program source code of the software service to remove the program source code implementing each feature whose removal would not generate errors during execution of any of the selected code paths.

16. The system according to claim 15, wherein the graph creator is configured for recursively scanning program source code of the software service for named feature flags to determine the dependencies between the features.

17. The system according to claim 15, wherein the logging interface is further configured for measuring the frequency or count of usage, or both, for each of the plurality of code paths by analyzing data logged in a logging database by the software service during execution in the production environment.

18. The system according to claim 15, wherein the simulator is configured to obtain the one or more selected features either by automatically traversing the graph of the functional dependencies, or by receiving an input from a user, or both.

19. The system according to claim 15, further coupled to an integration tester, wherein the refactoring unit automatically causes the integration tester to subject the refactored program source code to one or more unit tests, integration tests, performance tests, or smoke tests to verify that removal of the program source code implementing the feature will not result in execution errors.

20. The system according to claim 15, further coupled to a deployment gateway, wherein the refactoring unit automatically causes the deployment gateway to redeploy the refactored source code into the production environment as the software service.

\* \* \* \* \*